United States Patent
Triantos

(10) Patent No.: US 8,291,641 B2
(45) Date of Patent: Oct. 23, 2012

(54) METHOD FOR HYDROPONICALLY GROWING PLANTS THAT ARE ROOT-NURTURED

(76) Inventor: Phillip Triantos, Roselle, IL (US)

( * ) Notice: Subject to any disclaimer, the term of this patent is extended or adjusted under 35 U.S.C. 154(b) by 0 days.

(21) Appl. No.: 13/305,552

(22) Filed: Nov. 28, 2011

(65) Prior Publication Data

US 2012/0066973 A1 Mar. 22, 2012

Related U.S. Application Data

(63) Continuation of application No. 11/487,249, filed on Jul. 14, 2006, now Pat. No. 8,065,833.

(60) Provisional application No. 60/699,885, filed on Jul. 16, 2005.

(51) Int. Cl.
*A01G 31/02* (2006.01)

(52) U.S. Cl. .......................................... 47/62 R

(58) Field of Classification Search .................. 47/59 R, 47/60, 62 R, 62 C, 62 E, 62 N, 63
See application file for complete search history.

(56) References Cited

U.S. PATENT DOCUMENTS 6,219,966 B1 * 4/2001 Lapointe et al. .............. 47/62 C

FOREIGN PATENT DOCUMENTS

JP 63279725 A * 11/1988

* cited by examiner

*Primary Examiner* — Son T Nguyen

(74) *Attorney, Agent, or Firm* — Michael Ries

(57) ABSTRACT

A method for hydroponically growing plants that are typically root-nurtured includes supplying a fluid to a main body with a top through a fill plug, maintaining the fluid at a pre-determined level in the main body with a top, an entrance end and an exit end by a drain pipe, feeding at least one plant with the fluid, the at least one plant disposed on the main body in a saddle with a top that has a strainer that is in contact with the pre-determined fluid level and returning the fluid to a reservoir from the main body. A second method for hydroponically growing plants that are typically root-nurtured includes supplying a fluid to a main body with a top through a dripper is also provided.

6 Claims, 6 Drawing Sheets

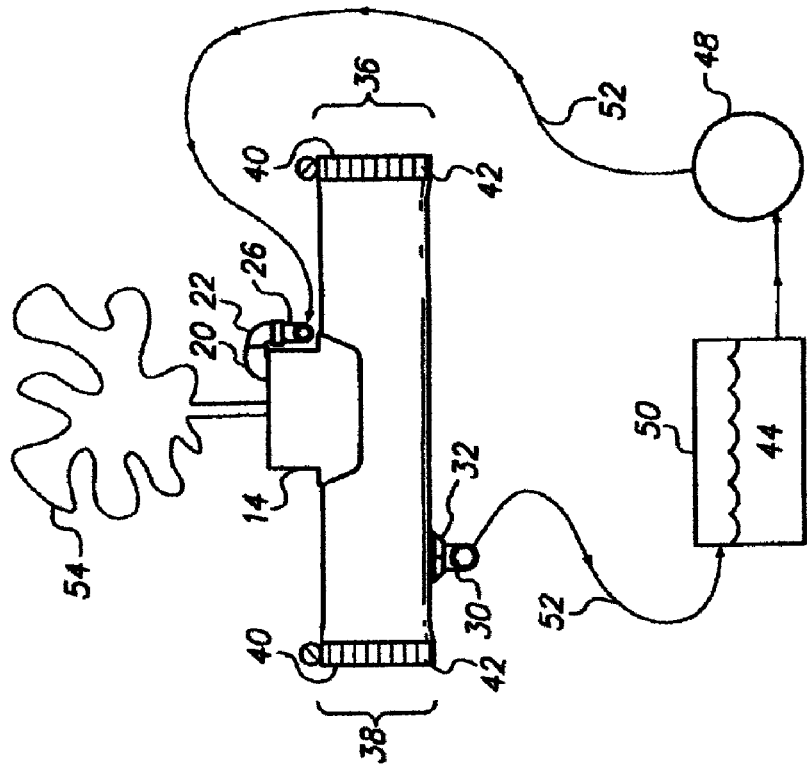
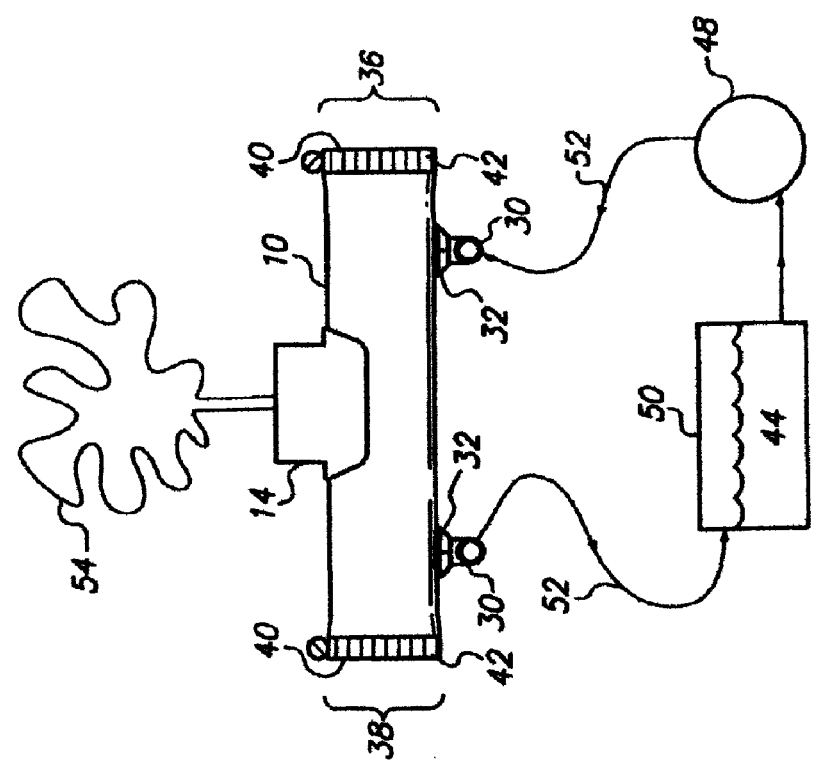
Figure 2B
Figure 2A

1300

Replacement Sheet 5 of 6

Supplying a fluid to a tubular main body through a fill plug
1310

Maintaining said fluid at a pre-determined level in said main body with a top, an entrance end and an exit end by a drain pipe
1320

Feeding at least one plant with said fluid, said at least one plant disposed on said main body in a saddle with a top that has a strainer that is in contact with said pre-determined fluid level
1330

Supporting a plate adjacent to said saddle and having a dripper inlet and a growth port formed therein
1340

Replacement Sheet 6 of 6

1300

Extending a dripper assembly with a dripper cap with a dipper hole, a left elbow connected to said dripper cap and a dripper cap elbow connected through said dripper inlet
1350

Returning said fluid to a reservoir from said main body.
1360

METHOD FOR HYDROPONICALLY GROWING PLANTS THAT ARE ROOT-NURTURED

This patent application claims priority to U.S. Provisional Application No. 60/699,885 filed on Jul. 16, 2005 which was the basis and priority of U.S. non-provisional application Ser. No. 11/487,249 filed on Jul. 14, 2006, all disclosures of which are incorporated herein by reference in its entirety. The present application is a continuation application of U.S. non-provisional application Ser. No. 11/487,249 filed on Jul. 14, 2006.

TECHNICAL FIELD & BACKGROUND

The present invention generally relates to the field of hydroponically growing plants that are root-nurtured, primarily without soil by a flowing liquid medium containing nutrients. More specifically, the present invention relates to a hydroponics growing method that has relatively better water height control and protection against rainwater intrusion and/or humidity loss. Additionally, the present invention requires relatively less solid growing media than other similar methods. The present invention also enables the sprouting of plant seeds, cuttings and the nurturing of seedlings.

The present invention allow the sprouting and nurturing of seedlings, height control of the hydroponics medium or fluid in a grotube, allow better sealing of the tubes, allow nutrient addition from below or above the plant root system, allow connections between the tubes, provide removable planter baskets or strainers that use no or lesser amounts of ROCK-WOOL slabs or growing blocks and solid growth supports such as clay pellets and provide sealing plates that reduce the exchange of moisture out of or into the hydroponics system. The grotube and functional components are constructed of readily obtainable materials typically PVC or food grade PVC.

BRIEF DESCRIPTION OF THE DRAWINGS

The present invention will be described by way of exemplary embodiments, but not limitations, illustrated in the accompanying drawings in which like references denote similar elements, and in which:

FIG. 2A illustrates a drawing of one embodiment of a grotube including an ebb and flow mode of hydroponics fluid contact with a plant root ball, in accordance with one embodiment of the present invention.

FIG. 2B illustrates a drawing of one embodiment of a grotube including a dripper to allow hydroponics fluid to contact the plant root ball from above in accordance with one embodiment of the present invention.

FIGS. 13A and 13B illustrate a flowchart of a method for hydroponically growing plants that are root-nurtured, primarily without soil by a flowing liquid medium containing nutrients,
in accordance with one embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "one embodiment" is used repeatedly. The phrase generally does not refer to the same embodiment, however, it may. The terms "comprising", "having" and "including" are synonymous, unless the context dictates otherwise. A feature list is provided below to assist in understanding the drawings while reviewing the present invention. It is understood that like features are like numbered throughout the drawings.

Figures 1A, 1B:
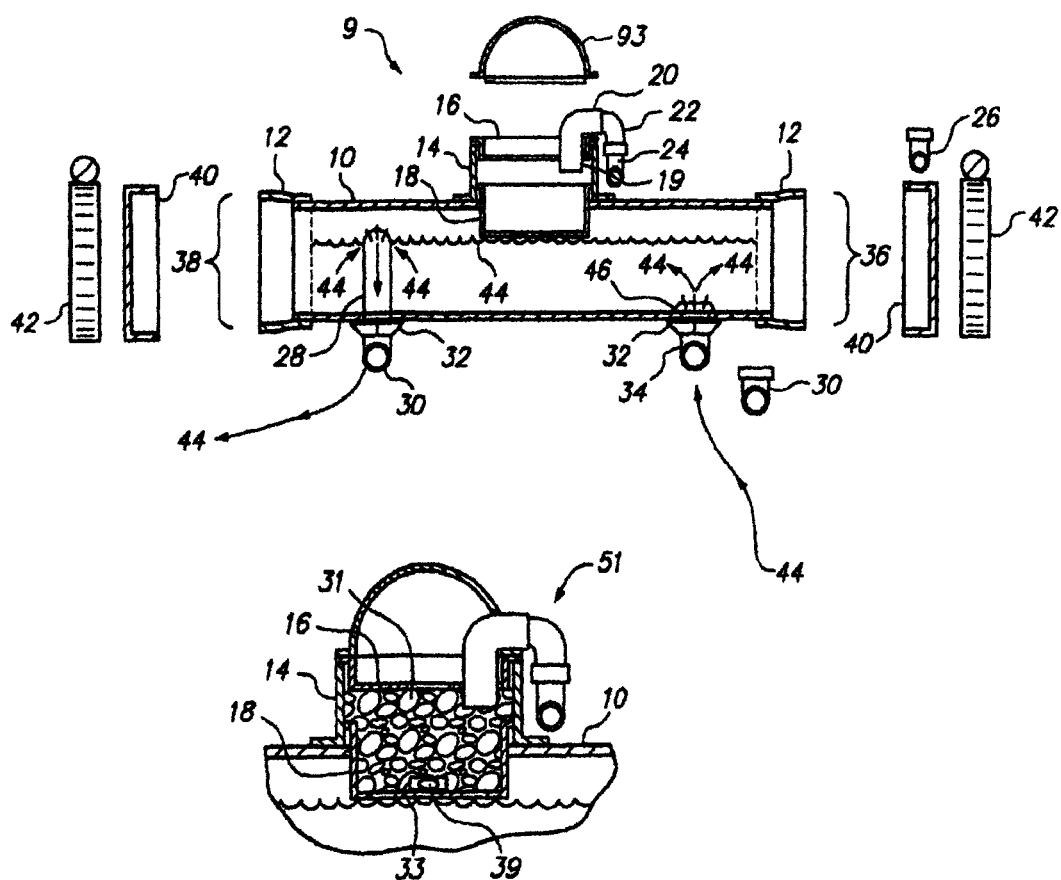
FIG. 1A illustrates a drawing of a sectional, side view of a grotube, in accordance with one embodiment of the present invention.
FIG. 1B illustrates a drawing of a sectional, side view of a grotube with a seed inside a grow block surrounded by clay pellets, in accordance with one embodiment of the present invention.

FIG. 1A, as in one embodiment, a grotube 9 in sectional side view is shown. Shown is main body 10 of the grotube. Illustrated are couplers 12 that may be configured for serial connection of a plurality of grotubes to form a linear grotube assembly. Many grotubes may be connected in parallel or a single grotube may be used alone. Finally, both combinations of serial and parallel connected grotubes can be assembled to make an arrangement of grotubes. Further illustrated in FIG. 2a are inflow 36 and outflow 38 ends of the grotube used with couplers 12 to assemble more than one grotube together in series or in parallel. End caps 40 and straps 42 can be attached to main body 10 to seal inflow and outflow ends to provide a grotube alone. In this embodiment of the grotube end caps 40 and straps 42 replace coupler 12.

In FIG. 1A, arrows show the direction of flow of fluid 44 through the grotube. This fluid 44 is a hydroponics medium that provides nutrients for plant 15 growth. The inside of the main body 10 may have clay pellets disposed throughout to help create more surface area for roots to grow. In one embodiment of the grotube fluid 44 flows from the inflow end 36 via tee 34 through fill plug 46 and exits the outflow end 38 via drain pipe 28, and finally another tee 34. Drain pipe 28 maintains the fluid at a predetermined level, approximately equal to the distance from the interior lower surface of main body or main body 10 to the top surface of drain pipe 28. This predetermined level makes sure the fluid is touching strainer 18 at the bottom. The height of drain pipe 28 may be changed to adjust the fluid level height in the grotube. Also the strainer 18 can be different depths to work in conjunction with drain pipe 28 to maintain the fluid level connect between these two parts.

In FIG. 1A, as in one embodiment, shown is a saddle 14, plate 16, strainer 18, left elbow 20, dripper cap elbow 22, small tee 24, and alternate connector small elbow 26. The grotube may use a tee 34 which allows for the parallel interconnection of grotubes. When tee 34 is replaced by elbow 30 the grotube can be used singly or as the end unit of an interconnected group of grotubes. Left elbow 20, dripper cap elbow 22, small tee 24, and alternate connector small elbow 26 are all part of a dripper system or dripper 51 to provide hydroponics fluid from above the root ball as shown is FIG. 2b. Also illustrated in FIG. 2b are a drain pipe 28, elbow 30, flange 32, and tee 34. In one embodiment of the grotube, tee 34, which allows for parallel interconnection of grotubes, is alternatively replaced by elbow 30.

Figure 4:
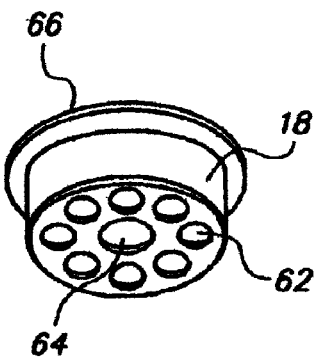
FIG. 4 illustrates a drawing of a strainer which is used as a root basket or plant root ball holder, in accordance with one embodiment of the present invention.

In FIG. 1B as in one embodiment shown are clay pellets 31 inside the 15 saddle 14 on top of strainer 18 with plate 16 covering the clay pellets 31. Dripper 51 is used for fluid supply from above the growing block 33. A cutting or seed 39 is placed in a growing block 33 and then is placed on the strainer 18. Clay pellets 31 may surround the growing block 33. The goal is to nourish the growing block 33 containing the seed or cutting 39 to produce a root ball that will eventually have roots hanging into the pool of hydroponics fluid inside main body 10 by way of strainer holes 62 or growth port 60. Strainer holes 62 and growth port 60 are shown in FIG. 4.

FIG. 2A illustrates one embodiment of a grotube including components the whole of which comprises a complete device. In this embodiment, one grotube is individually connected to pump 48 and reservoir 50 via tubing 52. Fluid 44 flows through the interconnected system in a counter-clockwise direction, from pump 48 via elbow 30 and fill plug 46 inside the grotube, into the grotube, exiting via drain plug or drain pipe 28 that is inside the grotube and second elbow 30 then exiting via second elbow 30. Flow continues into reservoir 44 and hence to the inlet side of pump 48. In this embodiment the inlet and outlet sides of main body 10 are sealed by end caps 40 and straps 42 so that fluid 44 is contained only in one grotube.

Shown in FIG. 2A is plant 54. This embodiment of the grotube illustrates the "ebb and flow" method of hydroponics nourishment, in which hydroponics fluid 44 is supplied from below the plant, contacting the roots or root ball of the plant without contacting the upper surfaces of the plant.

FIG. 2B illustrates one embodiment of a grotube including components the whole of which is a complete device. In this embodiment, one grotube is individually connected to pump 48 and reservoir 50 via tubing 52. Fluid 44 flows through the interconnected system in a counter-clockwise direction, from pump 48 via small elbow 26, through dripper cap elbow 22, through left elbow 20, onto the roots of plant 54, and finally into the grotube, exiting via elbow 30. Flow 20 continues into reservoir 44 and hence to the inlet side of pump 48. In this embodiment the inlet and outlet sides of main body 10 are also sealed by end caps 40 and straps 42 so that fluid 44 is contained in main body 10. This embodiment of the grotube illustrates the "drip" method of hydroponics nourishment, in which hydroponics fluid 44 is supplied from above plant 54, contacting the roots of the plant from above. Both the "ebb and flow" method of hydroponics nourishment and the "drip" method of hydroponics nourishment can exist in the same grotube at the same time.

Figure 3:
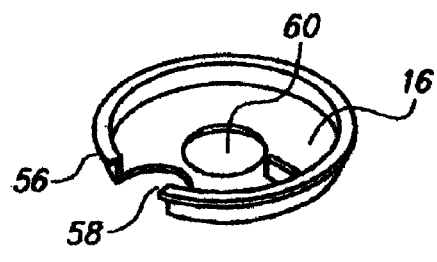
FIG. 3 illustrates a drawing of a plate for sealing that reduces moisture exchange between the interior and exterior of the grotube, in accordance with one embodiment of the present invention
Figure 5:
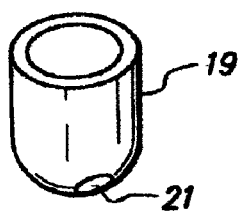
FIG. 5 illustrates a dripper cap with a dripper hole which is placed in the grotube to provide a supply of hydroponics fluid, in accordance with one embodiment of the present invention.

FIG. 3 illustrates plate 16. FIG. 4 illustrates strainer 18. Strainer 18 holds plant 54 and optionally solid growth media that provide additional support and nutrition for plant 54. FIG. 5 illustrates dripper cap 19 with dipper hole 21. Dripper cap 19 may be at least one quarter inch in diameter to avoid the dripper cap and dripper hole 21 from clogging especially from algae build up after use.

Figure 6:
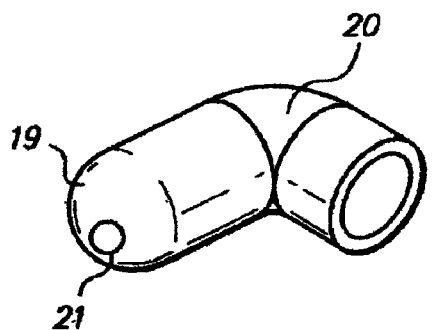
FIG. 6 illustrates a drawing of a connecting left elbow with dripper cap of the dripper system that is placed on the grotube and is typically connected to the connecting right elbow to provide a supply of hydroponics fluid from above, in accordance with one embodiment of the present invention.
Figure 7:
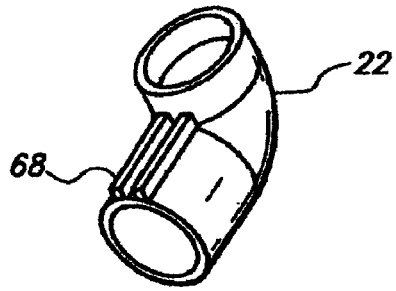
FIG. 7 illustrates a drawing of a dripper cap elbow, in accordance with one embodiment of the present invention.
Figure 8:
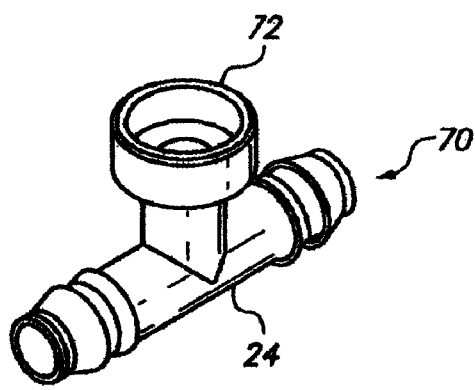
FIG. 8 illustrates a drawing of a connecting small tee, in accordance with one embodiment of the present invention.
Figure 9:
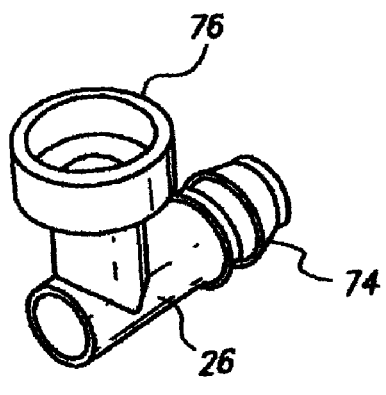
FIG. 9 illustrates a drawing of a connecting small elbow, in accordance with one embodiment of the present invention.

FIGS. 6, 7 and 8 respectively illustrate dripper cap 19, dripper cap 19 connected to left elbow 20 and may be connected to dripper cap elbow 22. These together make up the dripper 51. FIG. 6 has left elbow 20 connected to dripper cap 19 and dripper cap 19 has dripper hole 21. FIG. 9 shows small elbow 26. Dripper cap elbow 22 may join with left elbow 20 to form an overall "U" shaped assembly; left elbow 20 is inserted through plate 16 via left elbow port 58 and left elbow 20 with dripper hole 21 provides the hydroponics fluid nourishment from above. Dripper cap elbow 22 has channel 68 that will slide over rib 25 to hold the dripper 51 in position. Small tee 24, illustrated in FIG. 8, attaches to the bottom of a right elbow. Upon growth, plant 54 protrudes through growth port 60 in plate 16. In one embodiment, tubing 52 may be attached to small tee 24, and a grotube may be used in the "drip mode". In this embodiment, small tee 24 is also connected in parallel to other grotube and fluid flows downward onto the plant root system from left elbow 20 after passing through dripper cap elbow 22. Fluid then continues into main body 10. FIG. 9 as in one embodiment, instead of small tee 24, small elbow 26 is attached to the right elbow, the right elbow may attach to dripper cap elbow 22 or left elbow 20. Rather than operating in parallel with another grotube this allows for the operation of a single grotube.

Figure 10:
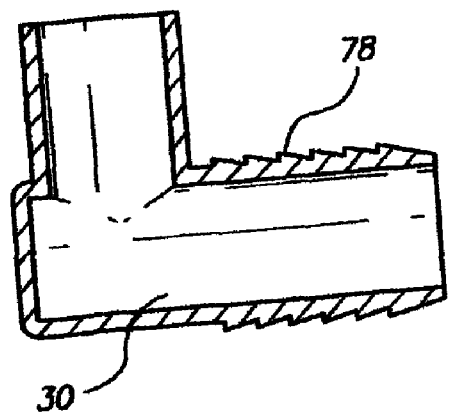
FIG. 10 illustrates a cross sectional drawing of an elbow, in accordance with one embodiment of the present invention.
Figure 12:
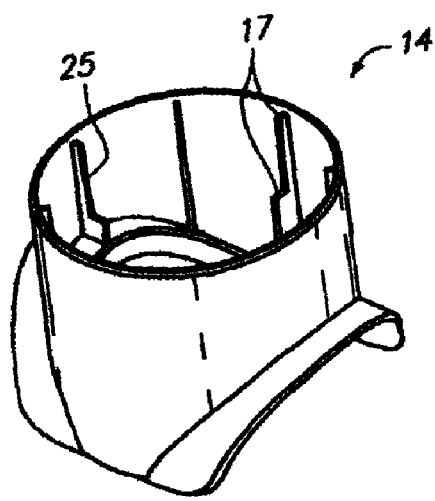
FIG. 12 illustrates a drawing of a saddle or plant site saddle, in accordance with one embodiment of the present invention.

FIG. 10 is a cross sectional illustration of elbow 30 which has elbow hose barbs 78. The hose barbs form a rugged connection with tubing 52. Elbow 30 forms an outflow connector from pipe 10 that allows return of fluid 44 to reservoir 50 through tubing 52. FIG. 12 illustrates tee 34 with tee hose barbs 80.

Figure 11:
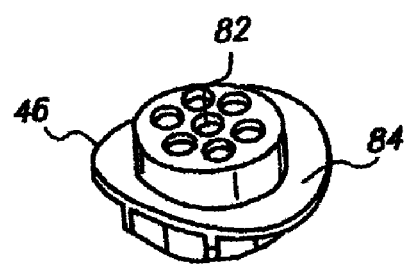
FIG. 11 illustrates a drawing of a fill plug, in accordance with one embodiment of the present invention.

FIG. 11 illustrates fill plug 46. Fill flange 84 of fill plug 46 abuts the lower surface of main body 10 flange 32 at inflow end 36. Fluid flows upward through fill holes 82. The fill holes 82 are shaped and arranged to avoid clogging that may happen from the clay pellet particles or other debris. However the design of having the shorter fill plug 46 supply the fluid causes a flushing action at fill holes 82 that substantially avoids clogging.

FIG. 12 as in one embodiment shows the saddle 14 with integral shelves 17 for the plate 16 and strainer 18 to rest on. Rib 25 will allow the channel 68 to slide onto rib 25 to hold into a particular position dipper 51. Plate 16 is above strainer 18, both of which are supported on and in saddle 14; plate 16 and strainer 18 rest on rims 56 and 66 inside saddle 14 on integral shelves 17 in saddle 14. Plate 16 provides a partial seal that substantially prevents water vapor from escaping from the grotube. Plate 16 also partially prevents rain water from accumulating in the grotube. Plate 16 and strainer 18 are both removable from saddle 14.

Figure 13B:
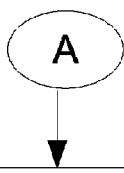

FIGS. 13A and 13B illustrates a flowchart of a method 1300 for hydroponically growing plants that are root-nurtured, primarily without soil by a flowing liquid medium containing nutrients, in accordance with one embodiment of the present invention.

The method 1300 steps include supplying a fluid to a tubular main body through a fill plug 1310, maintaining said fluid at a pre-determined level in said main body with a top, an entrance end and an exit end by a drain pipe 1320, feeding at least one plant with the fluid, the at least one plant disposed on the main body in a saddle with a top that has a strainer that is in contact with the pre-determined fluid level 1330, supporting a plate adjacent to the saddle and having a dripper inlet and a growth port formed therein 1340, extending a dripper assembly with a dripper cap with a dipper hole, a left elbow connected to the dripper cap and a dripper cap elbow connected through the dripper inlet 1350 and returning the fluid to a reservoir from the main body 1360. Components of the apparatus utilized in the method 1300 are illustrated and described in FIGS. 1A-12 and their descriptions.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method, comprising:
 supplying a fluid to a tubular main body through a fill plug;
 maintaining said fluid at a pre-determined level in said main body with a top, an entrance end and an exit end by a drain pipe;
 feeding at least one plant with said fluid, said at least one plant disposed on said main body in a saddle with a top that has a strainer that is in contact with said pre-determined fluid level;
 supporting a plate adjacent to said saddle and having a dripper inlet and a growth port formed therein;
 extending a dripper assembly with a dripper cap with a dipper hole, a left elbow connected to said dripper cap and a dripper cap elbow connected through said dripper inlet; and
 returning said fluid to a reservoir from said main body.

2. The method according to claim 1, wherein a plurality of said main bodies is joined serially with at least one connector to form a serial assembly of said main bodies.

3. The method according to claim 1, wherein said tubular main body is defined by an inside surface, an outside surface, a bottom wall portion, a top wall portion, a first end, a second end, an outlet formed in said bottom wall portion, a first inlet formed in said bottom wall portion, a second inlet portion and a plurality of ports formed in said top wall portion.

4. The method according to claim 3, wherein said saddle is coupled to each said port formed in said top wall portion to support said at least one plant.

5. The method according to claim 3, wherein said method includes a pump to supply said fluid to both said first inlet and said second inlet portion and receiving said fluid from said outlet.

6. The method according to claim 1, wherein said strainer having a lower portion containing a plurality of strainer apertures formed therein and interposed within said saddle and each said port formed in said top wall portion to support a root ball of said at least one plant, wherein said root ball selectively includes a plurality of roots extending therefrom and interposed through said strainer apertures wherein at least a portion of said roots may contact said fluid contained within said main body, said growth port permits said at least one plant to extend upwardly therethrough.

* * * * *